US010558602B1

(12) United States Patent
Diamand

(10) Patent No.: US 10,558,602 B1
(45) Date of Patent: Feb. 11, 2020

(54) TRANSMIT BYTE ENABLE INFORMATION OVER A DATA BUS

(71) Applicant: Intel Corporation, Santa Clara, CA (US)

(72) Inventor: Israel Diamand, Aderet (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/130,748

(22) Filed: Sep. 13, 2018

(51) Int. Cl.
*G06F 13/40* (2006.01)
*G06F 13/16* (2006.01)

(52) U.S. Cl.
CPC ...... *G06F 13/4027* (2013.01); *G06F 13/1673* (2013.01)

(58) Field of Classification Search
None
See application file for complete search history.

(56) References Cited

U.S. PATENT DOCUMENTS

| 7,724,781 | B1* | 5/2010 | Wu | H04J 3/1611 370/510 |
| 7,729,384 | B1* | 6/2010 | Mantri | H04L 1/0041 370/476 |
| 2008/0022186 | A1* | 1/2008 | Co | G06F 11/1044 714/763 |
| 2012/0281489 | A1* | 11/2012 | Ware | G11C 5/14 365/203 |
| 2019/0042496 | A1* | 2/2019 | Peffers | G06F 13/1673 |

* cited by examiner

*Primary Examiner* — Henry Tsai
*Assistant Examiner* — Aurangzeb Hassan
(74) *Attorney, Agent, or Firm* — Lowenstein Sandler LLP

(57) ABSTRACT

A transmitter comprising an input data buffer to store a plurality of bytes received on a first interconnect; multiplexer circuitry coupled to the input data buffer; and an output buffer coupled to the multiplexer circuitry, a second interconnect, and a third interconnect. The multiplexer circuitry is to: receive byte enable information in the input data buffer; determine that one or more of the plurality of bytes stored in the input data buffer are invalid; store an indicator in the output buffer; store valid bytes of the plurality of bytes in the output buffer to transmit on the third interconnect; and store the byte enable information in the output buffer to transmit on the third interconnect.

17 Claims, 15 Drawing Sheets

000# TRANSMIT BYTE ENABLE INFORMATION OVER A DATA BUS

TECHNICAL FIELD

Embodiments of the disclosure relate generally to transmitting data, and more specifically, but without limitation, transmitting byte enable information over a data bus.

BACKGROUND

In various protocols and fabrics (e.g., in-die interconnect (IDI), Ring, cable management interface (CMI), Intel On-Chip System Fabric (IOSF), AXI, etc.), the data bus is accompanied by a byte enable bus to allow partial write operation. The size of the byte enable bus is equal to the number of bytes in the data bus. The data transmitted over the byte enable bus increases the number bits to be transmitted (e.g., 12.5% increase). However, system architecture may require that the number of signals or pins to be reduced without compromising the transmission bandwidth.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

As described above, in conventional systems, the data bus is accompanied by a byte enable bus to allow partial write operations. The size of the byte enable bus is equal to the number of bytes in the data bus. The data transmitted over the byte enable bus increases the number bits to be transmitted (e.g., 12.5% increase). The embodiments described herein are directed to transmitting byte enable information over a data bus (rather than over the byte enable bus). As a result, a reduced amount of bits are transferred over the combination of the data bus and the byte enable bus.

In one embodiment, a transmitter includes an input data buffer to store a plurality of bytes received on a first data bus of a fixed length, multiplexer circuitry coupled to the input data buffer, and an output buffer coupled to the multiplexer circuitry. The multiplexer circuitry is to: receive byte enable information associated with the plurality of bytes in the input data buffer; determine that one or more of the plurality of bytes are invalid; store an indicator indicating that the one or more of the plurality of bytes are invalid in the output buffer to transmit on a second data bus; store valid bytes of the plurality of bytes in the output buffer to transmit on a third data bus of the fixed length; and store the byte enable information in the output buffer to transmit on the third data bus of the fixed length.

Figure 1:
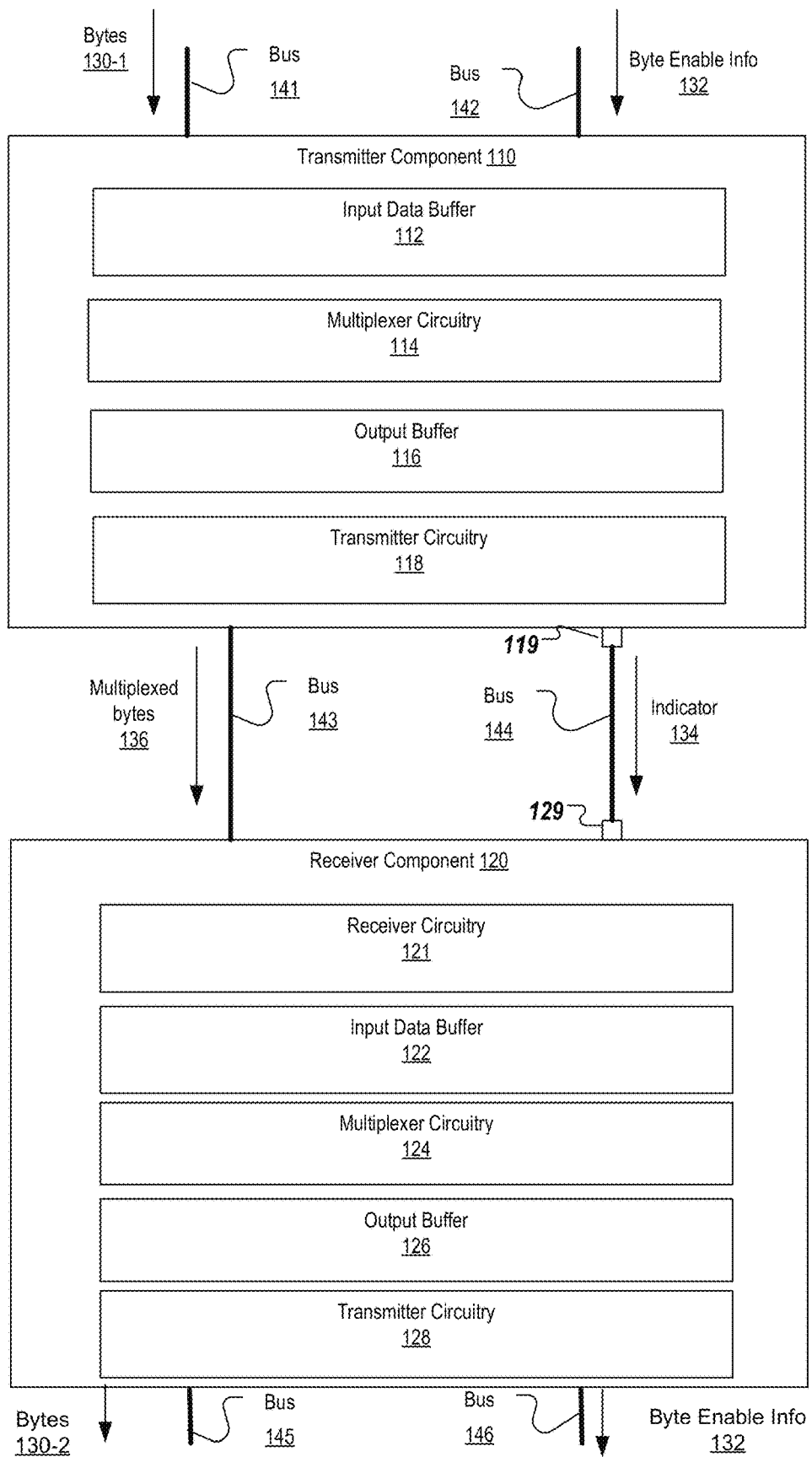
FIG. 1 illustrates a block diagram of a transmitter component coupled to a receiver component according to various embodiments.

FIG. 1 depicts transmitter component 110 coupled to receiver component 120.

In general, transmitter component 110 receives bytes 130-1 (e.g., eight bytes of data) over data bus 141 and byte enable information 132 (e.g., eight bits of data) corresponding to each byte in bytes 130-1 over a byte enable bus 142. In one embodiment, the total amount of bits for bytes 130 and byte enable information 130 is 72 bits (e.g., 64 bits in bytes 130-1 and 8 bits in byte enable information 132). In one embodiment, data bus 141 is a fixed length bus (e.g., 64 bits). Byte enable bus 142 is an eight bit byte enable bus.

As will be described in further detail herein, transmitter component 110 transmits indicator 134 (e.g., a single bit) over bus 144 and multiplexed bytes 136 over the data bus 143 (e.g., a fixed length 64 bit bus). Multiplexed bytes 136, in various embodiments, is either (1) bytes 130-1, or (2) a portion of bytes 130-1 and byte enable information 132. As a result, the amount of data transmitted to receiver component 120 (from transmitter component 110) is less than the amount of data that was received by transmitter component 110. For example, 64 bits are transmitted over the data bus 143 and 1 bit is transmitted over bus 144 for a total of 65 bits transmitted to receiver component 120. This allows for a reduced amount of bits to be to be transmitted to receiver component 120.

Additionally, as will be described in further detail herein, upon receiving multiplexed bytes 136 (e.g., 64 bits) and indicator 134 (e.g., 1 bit), receiver component 120 transmits bytes 130-2 (e.g., 64 bits) over data bus 145 (e.g., 64 bit bus) and byte enable information 132 (e.g., 8 bits) over byte enable bus 146 (e.g., 8 bit bus).

It should be appreciated that the busses described herein (e.g., bus 141, bus 142, bus 143, bus 144, bus 145 and/or bus 146) can be various types of interconnects, such as but not limited, peripheral component interconnect (PCI), PCI express (PCIe), etc.

Transmitter component 110, in various embodiments, includes input data buffer 112, multiplexer circuitry 114, output buffer 116 and transmitter circuitry 118. Input data buffer 112 stores bytes 130-1. Bytes 130-1, in one embodiment, includes eight bytes of data that are received over a data bus. However, bytes 130-1 can include any number of bytes of data. In various embodiments, bytes 130-1 are each 8 bits. However, the data in the input buffer can be any length (e.g., word, double word). The separate portions of data in the data buffer can each include the same number of bits or have a different number bits with respect to one another. It should be appreciated that if the number of bits in each separate portion of data is different, then the smallest portion is large enough to hold the entire byte enablers (e.g., it is equal to or greater than the number of bytes").

In one embodiment, input data buffer 112 stores byte enable information 132. Byte enable information 132, in one embodiment, is a byte enable vector that includes a single bit per the number of bytes of bytes 130-1. For example, if bytes 130-1 has eight bytes, then byte enable information 132 includes eight bits, where each bit respectively corresponds to a byte in bytes 130-1.

Figure 2A:
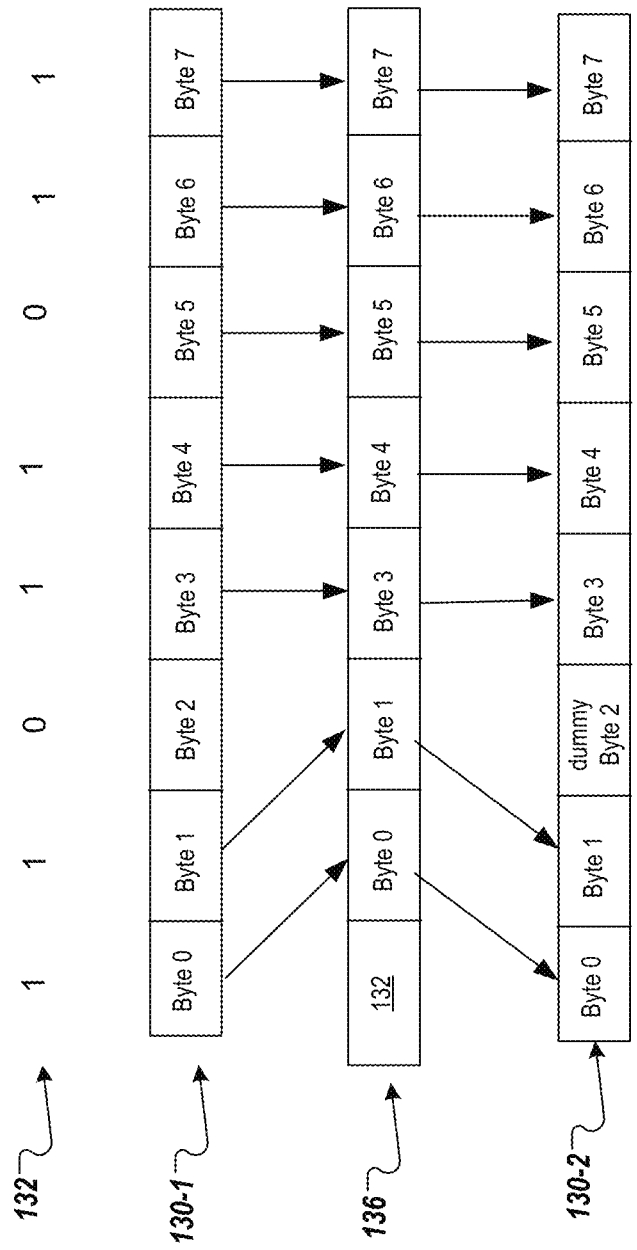
FIG. 2A illustrates a block diagram of a byte enable vector, bytes and multiplexed bytes according to various embodiments.

Multiplexer circuitry 114 multiplexes bytes 130-1 such that bytes 130-1 includes byte enable information 132. Referring to FIG. 2A, bytes 130-1 includes 8 bytes (e.g., Byte 0 to Byte 7). Similarly, byte enable information 132 includes 8 bits corresponding to bytes 130-1. For example, byte enable information 132 is a byte vector of 8 bits (e.g., bits 11011011). In various embodiments, the bits of byte enable information 132 indicate whether the corresponding bytes are valid or not valid. If a byte enable bit is valid, then the corresponding byte can be transmitted. For example, referring to FIG. 2A, Bytes 0, 1, 3, 4 6 and 7 are valid because the corresponding byte enable bits are marked as '1'. As will be described in further detail below, an invalid byte (e.g., byte 2 or byte 5) is removed from bytes 130-1 and replaced with byte enable information 132. It is noted that if there are two or more invalid bytes, then only one of the invalid bytes is removed. As such, any remaining invalid bytes (e.g., byte 5) remain in bytes 130-1 and are transmitted which is described in further detail below.

If a byte enable bit is not valid, then the corresponding byte does not need to be transmitted. In other words, the valid bytes of bytes 130-1 are intended to be transmitted while the invalid bytes do not need to be (or are not intended to be) transmitted. For example, Bytes 2 and 5 are invalid because the corresponding byte enable bits are marked as '0'.

Multiplexer 114 multiplexes bytes 130-1 to multiplexed bytes 136. In particular, multiplexer 114 determines which bytes of bytes 130-1 are invalid. If any bytes are invalid, multiplexer 114 removes one of the invalid bytes. In one embodiment, multiplexer 114 removes the first invalid byte. For example, Byte 2 is the first invalid byte of bytes 130-1 (starting from left to right). However, Byte 5 could be the first invalid byte of bytes 130-1 (starting from right to left).

Upon removing the first invalid byte (e.g., Byte 2), multiplexer 114 multiplexes bytes 130-1 by shifting Byte 0 and Byte 1 to the right (in multiplexed bytes 136). This takes up the spot of removed Byte 2 and leaves Byte 0 open in multiplexed bytes 136. Multiplexer 114 then places byte enable information 132 into Byte 0 of multiplexed bytes 136.

It should be appreciated that any invalid byte can be removed. Additionally, multiplexer 114 can shift remaining valid bytes either right or left such as to make an open spot for byte enable information 132. In one embodiment, Byte 0 is marked as invalid. Accordingly, Byte 0 is removed (without shifting any other bytes) and byte enable information 132 is placed in the position of Byte 0. It should be appreciated that the algorithm that is used to place the byte enable vector (and remove the invalid byte) is defined such that the receiver knows how to rebuild the original data. For example, if the algorithm indicates that the first invalid byte is to be removed (e.g., Byte 2) then the receiver is able to rebuild the original byte vector such that removed byte (e.g., Byte 2) is replaced by a dummy byte. Similarly, if the algorithm indicates that the last invalid byte is to be removed (e.g., Byte 5) then the receiver is able to rebuild the original byte vector such that removed byte (e.g., Byte 5) is replaced by a dummy byte.

Referring to FIG. 1, multiplexer 114 generates indicator 134. Indicator 134 is a flag that indicates whether multiplexer bytes 136 are valid or invalid. In one embodiment, if each of the bytes in bytes 130-1 are valid, then each of the bytes of bytes 130-1 are output by multiplexer 114. More specifically, if each of the bytes in bytes 130-1 are valid (e.g., flagged as '1') then each of the bytes in bytes 130-1 are output from multiplexer 114 as multiplexer bytes 136. If each of the bytes 130-1 are valid then the group of bytes is marked as "Full" by indicator 134.

In another embodiment, if at least one of the bytes 130-1 is invalid, then the at least one invalid byte is removed from bytes 130-1. Additionally, multiplexer 114 generates multiplexed bytes 136 by multiplexing a portion of bytes 130-1 and byte enable information 132, as described herein with respect to FIG. 2A. More specifically, if one of the bytes of bytes 130-1 is invalid (e.g., flagged as '0') then the group of bytes is marked as "Partial", by indicator 134, and the byte enable information is multiplexed into multiplexed bytes 136 (e.g., Byte 0 of multiplexed bytes 136). A more detailed description of a multiplexer 114 is described with respect to FIG. 2B.

Output buffer 116 stores multiplexed bytes 136 to transmit over bus 143. In one embodiment, output buffer 116 stores indicator 134 to transmit over bus 144.

Transmitter circuitry 118 transmits multiplexed bytes 136 over bus 143 (e.g., 64 bit data bus) to receiver component 120. In one embodiment, transmitter component 110 includes a plurality of pins (not shown) coupled to transmitter circuitry 118. The multiplexed bytes 136 are transmitted over bus 143 via the plurality of pins. Transmitter circuitry 118 transmits indicator 134 over bus 144 (e.g., 1 bit bus).

Transmitter component 110 includes pin 119 (e.g., a single pin) for transmission of indicator 134. Similarly, receiver component 120 includes pin 129 (e.g., a single pin) for receiving indicator 134 from transmitter component 110.

Receiver component 120 includes receiver circuitry 121, input data buffer 122, multiplexer circuitry 124, output buffer 126 and transmitter circuitry 128.

Receiver circuitry 121 receives multiplexed bytes 136 over data bus 143. In one embodiment, a plurality of pins (not shown) is coupled to receiver circuitry 121. As such, receiver circuitry 121 receives multiplexed bytes over data bus 143 via the plurality of pins. In one embodiment, receiver circuitry 121 receives indicator 134 over bus 144 via pin 129.

Input data buffer 122 stores multiplexed bytes 136. In one embodiment, input data buffer 122 stores indicator 134.

Multiplexer circuitry 124 multiplexes multiplexed bytes 136 to separate byte enable information 132 from the multiplexed bytes. Referring to FIG. 2A, bytes 136 (that include byte enable information 132) are received by multiplexer 124. Multiplexer 124 removes byte enable information 132 (e.g., bits 11011011) from the byte 0 position of multiplexed bytes 136. In view of byte enable information 132, multiplexer 124 determines which byte in multiplexed bytes 136 was marked as the invalid byte and removed from bytes 130-1 (by multiplexer 114). For example, multiplexer 124 determines that Byte 2 (the first invalid byte) was removed. Accordingly, multiplexer determines that Byte 0 and Byte 1 were previously shifted to the right and now need to be shifted to the left to their original position.

Multiplexer 124 then shifts Byte 1 (from the Byte 2 position in the multiplexed bytes 136) to its original position (in bytes 130-1 and shifts Byte 0 (from the Byte 1 position in multiplexed bytes 136) to its original position (in bytes 130-1), as shown in bytes 130-2. In one embodiment, if indicator 134 is marked as full, then byte enable information 132 is not in multiplexer bytes 136. Accordingly, multiplexed bytes 136 includes each of bytes 130-1. As such, bytes 130-2 (that is the same as bytes 130-1) are stored in output buffer for transmission over bus 145.

In another embodiment, if indicator 134 is marked as partial, then byte enable information 132 is extracted from multiplexed bytes, as described above. The extracted byte enable information 132 is then stored in output buffer 126 for transmission over bus 146. Additionally, a dummy byte (e.g., dummy Byte 2) is added to bytes 130-2 to take the place of original invalid Byte 2 (that was removed by multiplexer 114, as described above). Accordingly, bytes 130-2 (that includes dummy Byte 2) is stored in output buffer 126 for transmission over bus 145 (e.g., 64-bit data bus). A more detailed description of a multiplexer 114 is described with respect to FIG. 2C.

Figure 2B:
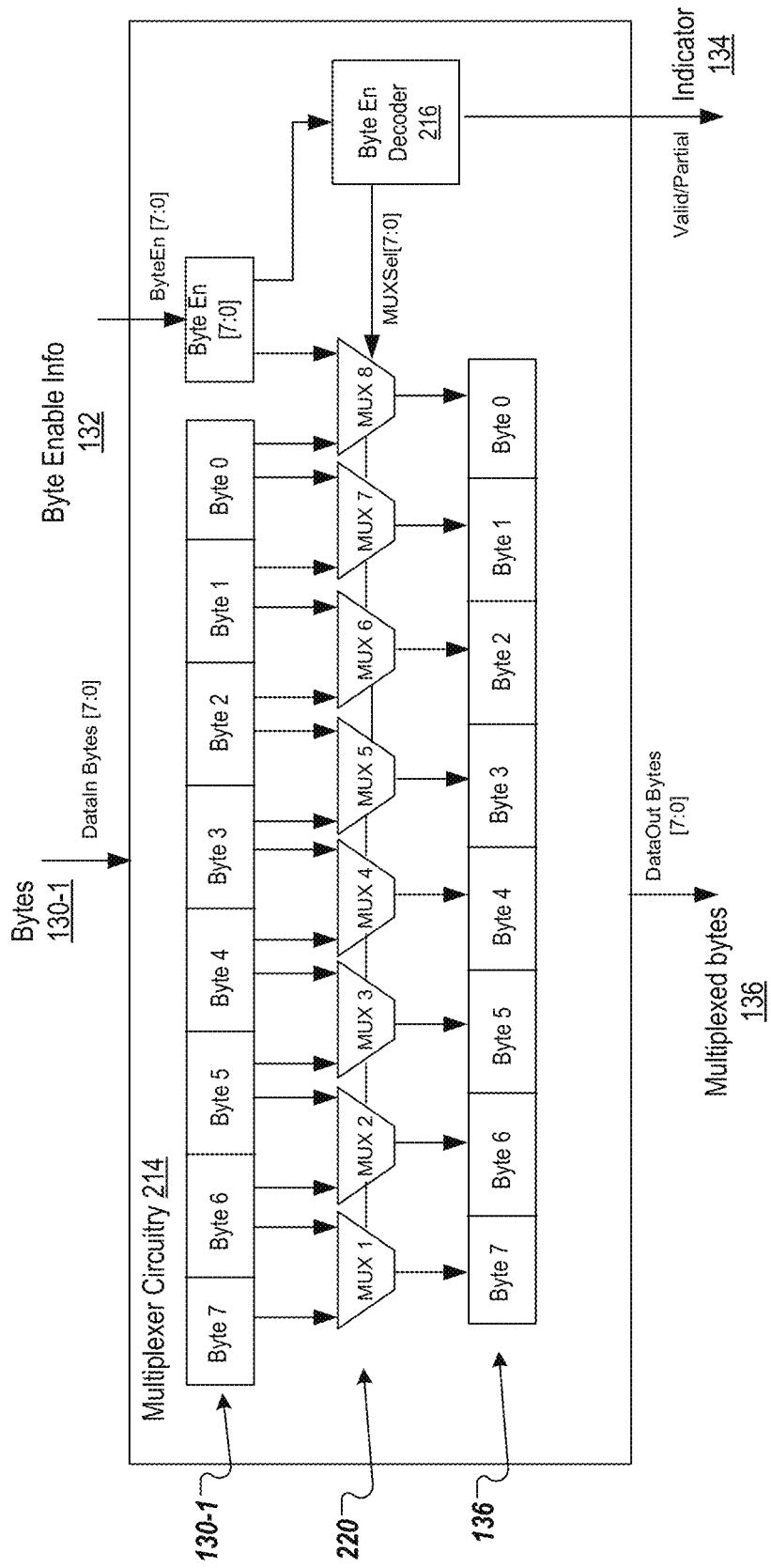
FIG. 2B illustrates a block diagram of a multiplexer circuitry according to various embodiments.

FIG. 2B depicts an embodiment of multiplexer 214. Multiplexer 214 is a more detailed depiction of multiplexer 114 described with respect to FIG. 1. Multiplexer 214 receives bytes 130-1 (e.g., Byte 0 through Byte 7) and byte enable information 132 (e.g., byte enable vector 11011011).

Multiplexer 214 includes a plurality of multiplexers 220 (e.g., MUX 1 through MUX 8). It is noted that MUX 1 through MUX 7 each have two bytes as input. For example, MUX 1 has Byte 7 and Byte 6 as input, MUX 2 has Byte 6 and Byte 5 as input and so on. Additionally, MUX 8 has a Byte 0 as input and byte enable information 132 as input.

Byte enable decoder 216 determines whether any of the bytes are valid or not valid. For example, if each of the bits in byte enable information 132 are marked as valid (e.g., byte enable vector is 11111111), then decoder 216 sends a MUX select signal to each MUX indicating that the each of the bytes of bytes 130-1 is to be output as multiplexed bytes 136. As such, multiplexed bytes 136 is bytes 130-1. In particular, MUX 1 passes through Byte 7, MUX 2 passes through Byte 6 and so on.

For another example, if one of the bits in byte enable information 132 is marked as invalid (e.g., byte enable vector is 11011011, where Byte 2 and Byte 5 are invalid), then decoder 216 determines the first invalid byte of bytes 130-1. Decoder 216 can determine that Byte 2 is the first invalid byte or that Byte 5 is the first invalid byte based on the starting point (e.g., Byte 7 or Byte 0) of the bytes 130-1. In such an example, decoder 216 determines that Byte 2 is the first invalid byte (or "hole" in bytes 130-1). Accordingly, decoder 216 sends a MUX select signals to MUX 1 through MUX 5 to output Byte 7 through Byte 3, respectively. Decoder 216 sends a MUX select signal to MUX 6 to pass through Byte 1 (rather than Byte 2) because Byte 2 is an invalid byte. As such, Byte 1 in bytes 130-1 is shifted to Byte 2 in multiplexed bytes 136. Similarly, decoder 216 sends a MUX select signal to MUX 7 to output Byte 0. As such, Byte 0 in bytes 130-1 is shifted to Byte 1 in multiplexed bytes 136.

Since Byte 1 and Byte 0 of bytes 130-1 were shifted to Byte 2 an Byte 1 of multiplexed bytes 136, decoder sends a MUX select signal to MUX 8 to output byte enable information 132. Accordingly, byte enable information (e.g., byte enable vector 11011011) is in Byte 0 of multiplexed bytes 136.

Decoder 216 generates indicator 134 based on whether (1) each of bytes 130-1 are valid or (2) at least one of bytes 130-1 is invalid. For example, if each of the bytes of bytes 130-1 are valid based on each of the bits of byte enable information being marked as '1', then decoder generates indicator 134 to indicate that multiplexed bytes 136 are valid (or full). In such an example, indicator 134 is flagged as '1' (e.g., a single bit set to '1').

In another example, if at least one of the bytes of bytes 130-1 is invalid based on at least one bit of byte enable information being marked as '0', then decoder 216 generates indicator 134 to indicate that multiplexed bytes 136 are partially valid. In such an example, indicator 134 is flagged as '0' (e.g., a single bit set to '0').

Figure 2C:
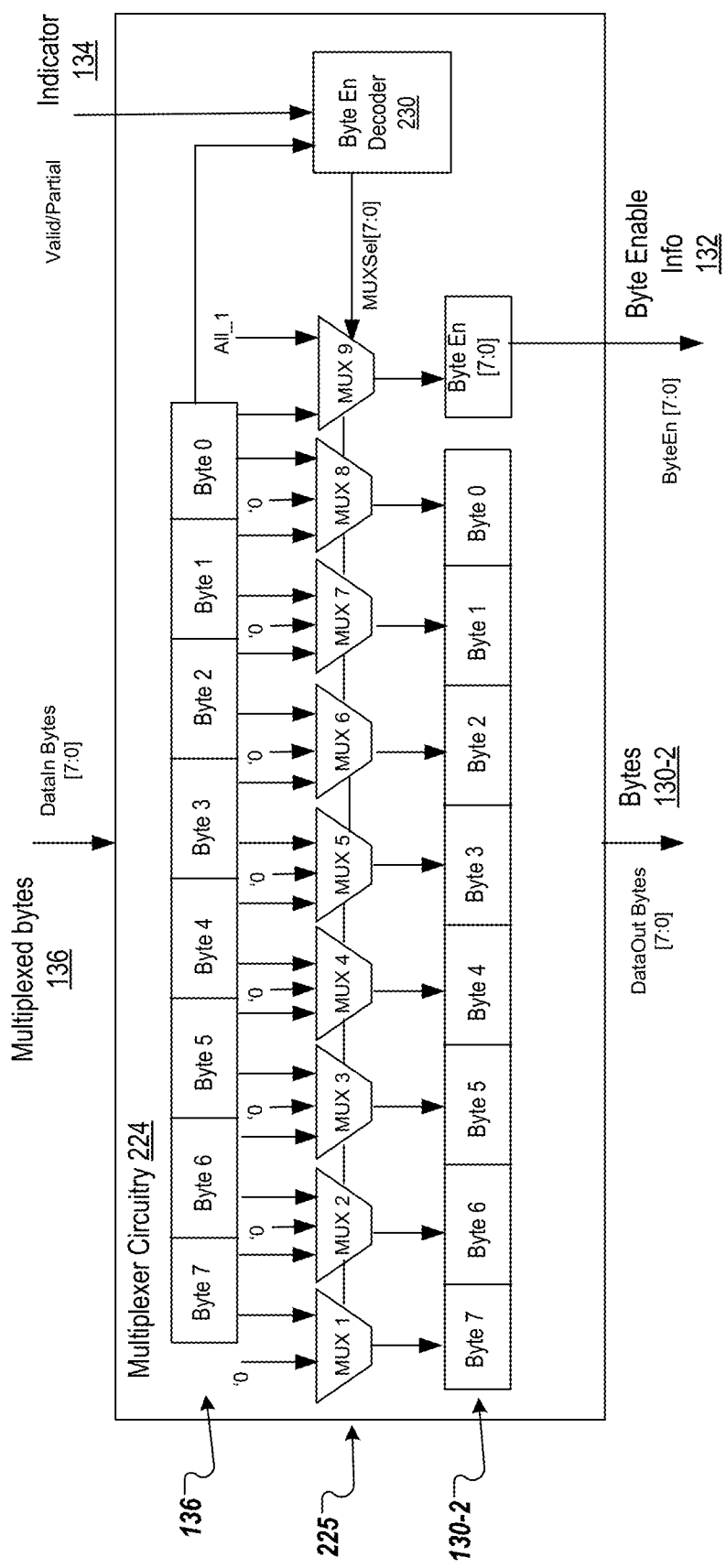
FIG. 2C illustrates a block diagram of a multiplexer circuitry according to various embodiments.

FIG. 2C depicts an embodiment of multiplexer 224. Multiplexer 224 is a more detailed depiction of multiplexer 124 described with respect to FIG. 1. Multiplexer 224 receives multiplexed bytes 136 (e.g., Byte 7 through Byte 0) and indicator 134 (e.g., single bit '0' or '1') from transmitter component 110.

Byte enable decoder 230 determines whether multiplexed bytes 136 are valid (e.g., each of the bytes are valid) or partially valid (e.g., at least one byte is invalid and replaced with byte enable information) based on indicator 134. If indicator 134 is set as valid, then decoder 230 determines that Byte 7 through Byte 0 of multiplexed bytes 136 are the same as bytes 130-1. Accordingly, decoder 230 sends a MUX select signal to MUX 1 through MUX 8 to output Byte 7 through Byte 0, respectively, bytes 130-2. Additionally, decoder 230 sends a MUX select signal to MUX 9 to output all 1's (e.g., 11111111) because each byte of bytes 136 are valid. Thus, the output of MUX 9 is byte enable information 132.

However, if indicator 134 is set to partial, then decoder 230 determines that Byte 0 is byte enable information 132. Decoder 230 reads Byte 0 (e.g., byte enable information 132) to determine which byte of bytes 130-1 is not a part of multiplexed bytes 136. For example, decoder 230, based on byte enable information 132 (e.g., byte enable vector 11011011), determines that Byte 2, from bytes 130-1 is not a part of multiplexed bytes 136. Additionally, decoder 230 determines that Byte 1 and Byte 0 of bytes 130-1 were shifted to Byte 2 and Byte 1 in multiplexed bytes 136 to take the place of Byte 2 (from bytes 130-1) and open Byte 0 for byte enable information 132.

Accordingly, decoder 230 sends a MUX select signal to MUX 1 through MUX 5 to output Byte 7 through Byte 3, respectively, because Byte 7 through Byte 3 (in bytes 130-1) were not shifted in multiplexed bytes 136. Decoder 230 sends a MUX select signal to MUX 7 and 8 to output Byte 2 and Byte 1, respectively. This shifts Byte 2 and Byte 1 of multiplexed bytes 136 to their original position of Byte 1 and Byte 0 in bytes 130-2. Additionally, decoder sends a MUX select signal to create a dummy Byte 2 by outputting dummy data (e.g., 00000000) into Byte 2 of bytes 130-2. This is done because original Byte 2 of bytes 130-1 was removed. It should be appreciated that dummy Byte 2 can include any data.

Figure 3:
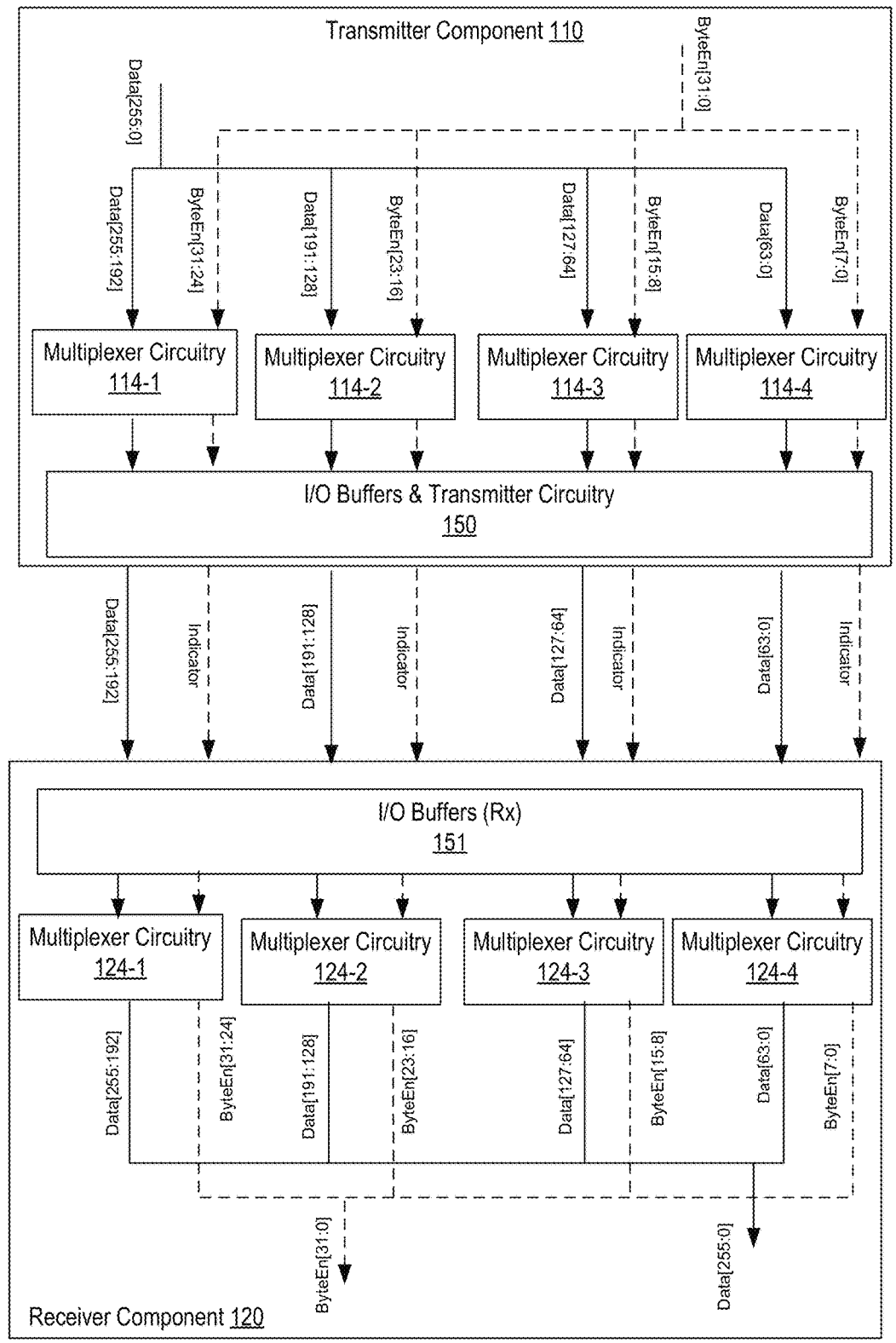
FIG. 3 illustrates a block diagram of a transmitter component coupled to a receiver component according to various embodiments.

FIG. 3 depicts system 300 that includes transmitter component 110 and receiver component 120. Transmitter component 110 includes a plurality of multiplexer circuitry 114 (e.g., multiplexer circuitry 114-1, 114-2, 114-3 and 114-4). Each multiplexer circuitry 114 receives bytes (e.g., bytes 130-1) over a data bus (e.g., a 64-bit data bus) and byte enable information (e.g., byte enable information 132) corresponding to the received bytes. As depicted, transmitter component receives 256 bits of data (or 32 bytes of data) and 32 bits of byte enable information. Each multiplexer circuitry 114 multiplexes the received bytes of data (received over a data bus) based on the received byte enable information (received over a byte enable bus). For example, each multiplexer 114 multiplexes the received bytes/byte enable information as described herein with respect to at least FIGS. 1 and 2B. The multiplexed bytes generated by the respective multiplexer circuitry 114 are stored in I/O buffers and transmitter 150 for transmission to receiver component 120. In one embodiment, multiplexed bytes from multiplexer 114-1 are transmitted over a first data bus, multiplexed bytes from multiplexer 114-2 are transmitted over a second data bus, multiplexed bytes from multiplexer 114-3 are transmitted over a third data bus, and multiplexed bytes from multiplexer 114-4 are transmitted over a fourth data bus.

Similarly, the indicators generated by the respective circuitry are stored in I/O buffers and transmitter 150 for transmission to receiver component 120. In one embodiment, an indicator from multiplexer 114-1 is transmitted over a first 1-bit bus, an indicator from multiplexer 114-2 is transmitted over a second 1-bit bus, an indicator from multiplexer 114-3 is transmitted over a third 1-bit bus, and an indicator from multiplexer 114-4 is transmitted over a fourth 1-bit bus.

Receiver component 120 receives the multiplexed bytes/indicators from transmitter component 110 at I/O buffers 151. Receiver component 120 includes a plurality of multiplexers 124 (e.g., multiplexer 124-1, multiplexer 124-2, multiplexer 124-3, and multiplexer 124-4). Each multiplexer 124 receives a multiplexed data/indicator created by a respective multiplexer 114. Each multiplexer 124 multiplexes the multiplexed data based on a respective indicator as described herein with respect to at least FIGS. 1 and 2C. Accordingly, each multiplexer 124 outputs bytes (e.g., bytes 130-2) for transmission over a respective data bus, and outputs byte enable information (e.g., byte enable information 132) for transmission over a respective byte enable bus.

Figure 4:
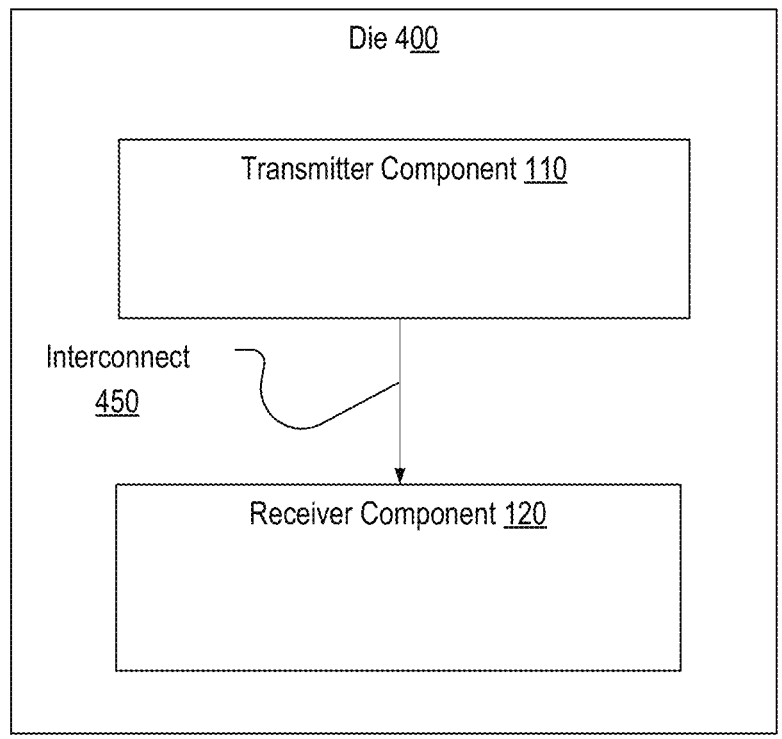
FIG. 4 illustrates a block diagram of a first die coupled to a second die according to various embodiments.

FIG. 4 is a block diagram of die 400. Die 400 includes transmitter component 110 and receiver component 120. Transmitter component 110 transmits data (e.g., multiplexed bytes 130-2 and indicator 134) via interconnect 450 to receiver component 120. In one embodiment, die 400 is a CPU, a system-on-chip (SOC), etc.

Figure 5:
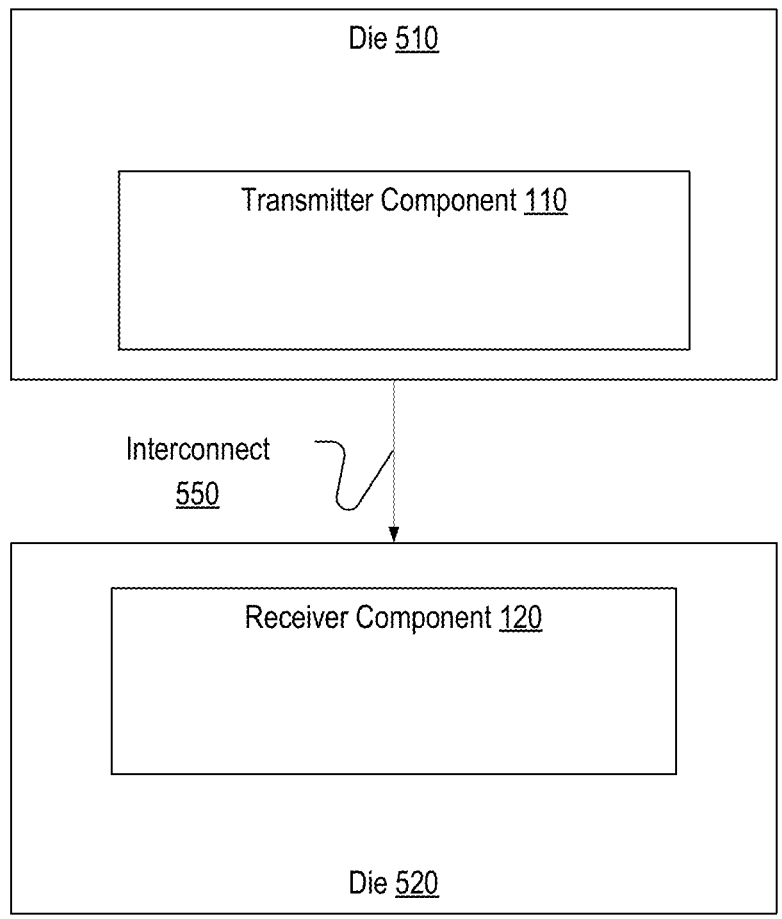
FIG. 5 illustrates a block diagram of a first die and a second die according to various embodiments.

FIG. 5 is a block diagram of die 510 and die 520. Die 510 includes transmitter component 110 and die 520 includes receiver component 120. Transmitter component 110 transmits data (e.g., multiplexed bytes 130-2 and indicator 134) via interconnect 550 (e.g., bus 143 and bus 144) to receiver component 120. In various embodiments, die 510 and/or die 520 is a CPU, a system-on-chip (SOC), etc.

Figure 6A:
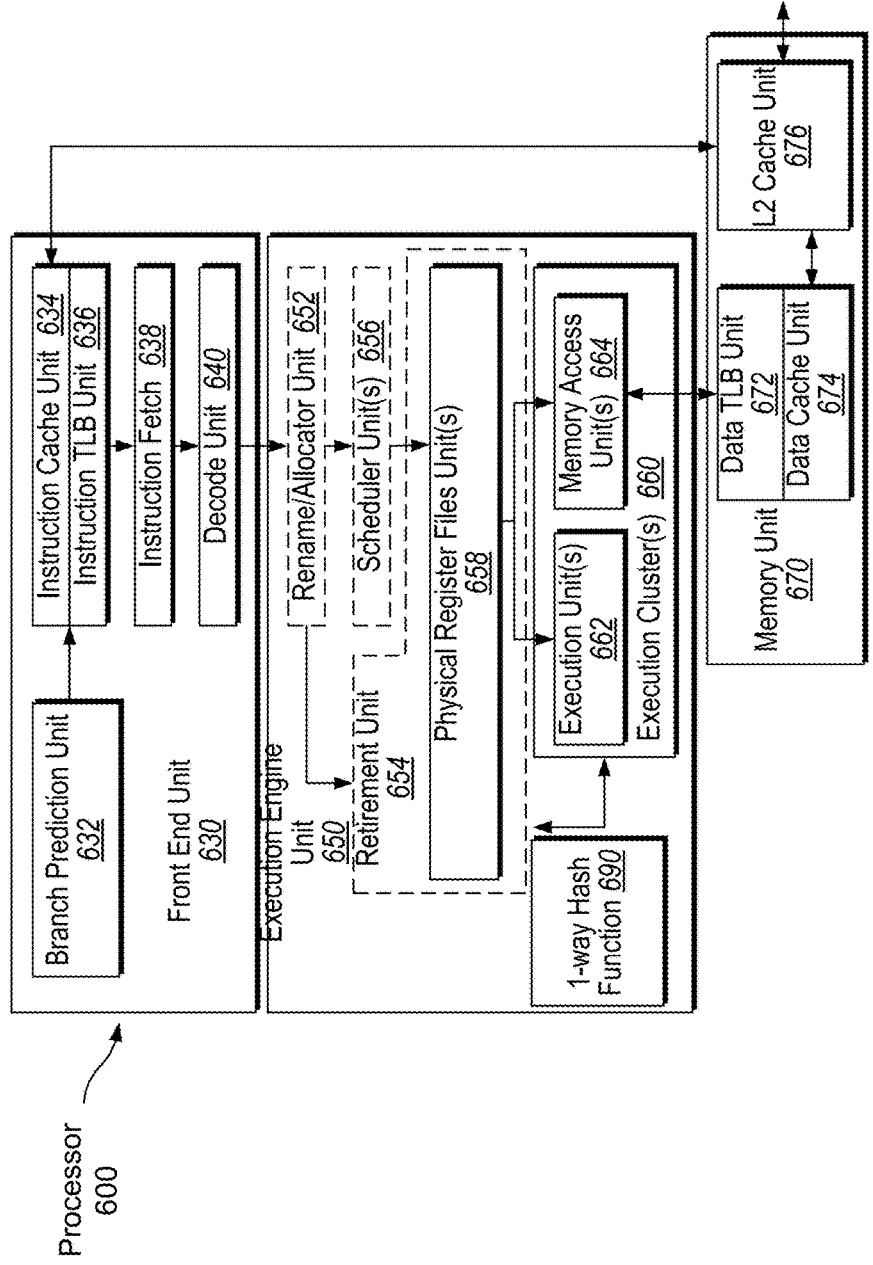
FIG. 6A is a block diagram illustrating a micro-architecture for a processor according to an embodiment of the disclosure.

FIG. 6A is a block diagram illustrating a micro-architecture for a processor 600 (e.g., transmission component 110 or receiving component 120) that implements the processing device including heterogeneous cores in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670 (e.g., receiving component 120). The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multiprocessor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 574 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
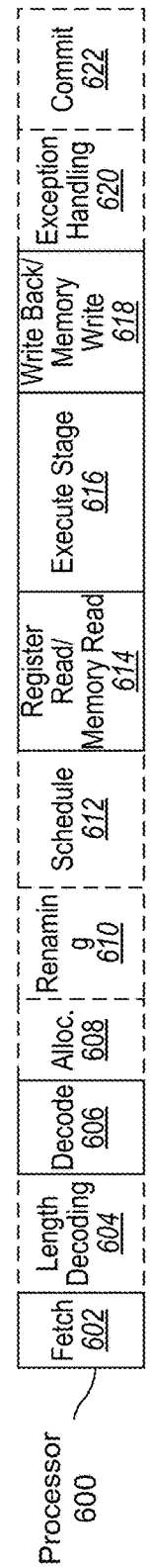
FIG. 6B is a block diagram illustrating an in-order pipeline and a register renaming stage, out-of-order issue/execution pipeline according to an embodiment of the disclosure.

FIG. 6B is a block diagram illustrating an in-order pipeline and a register renaming stage, out-of-order issue/execution pipeline implemented by processor 600 of FIG. 5A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor 600 as a pipeline includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
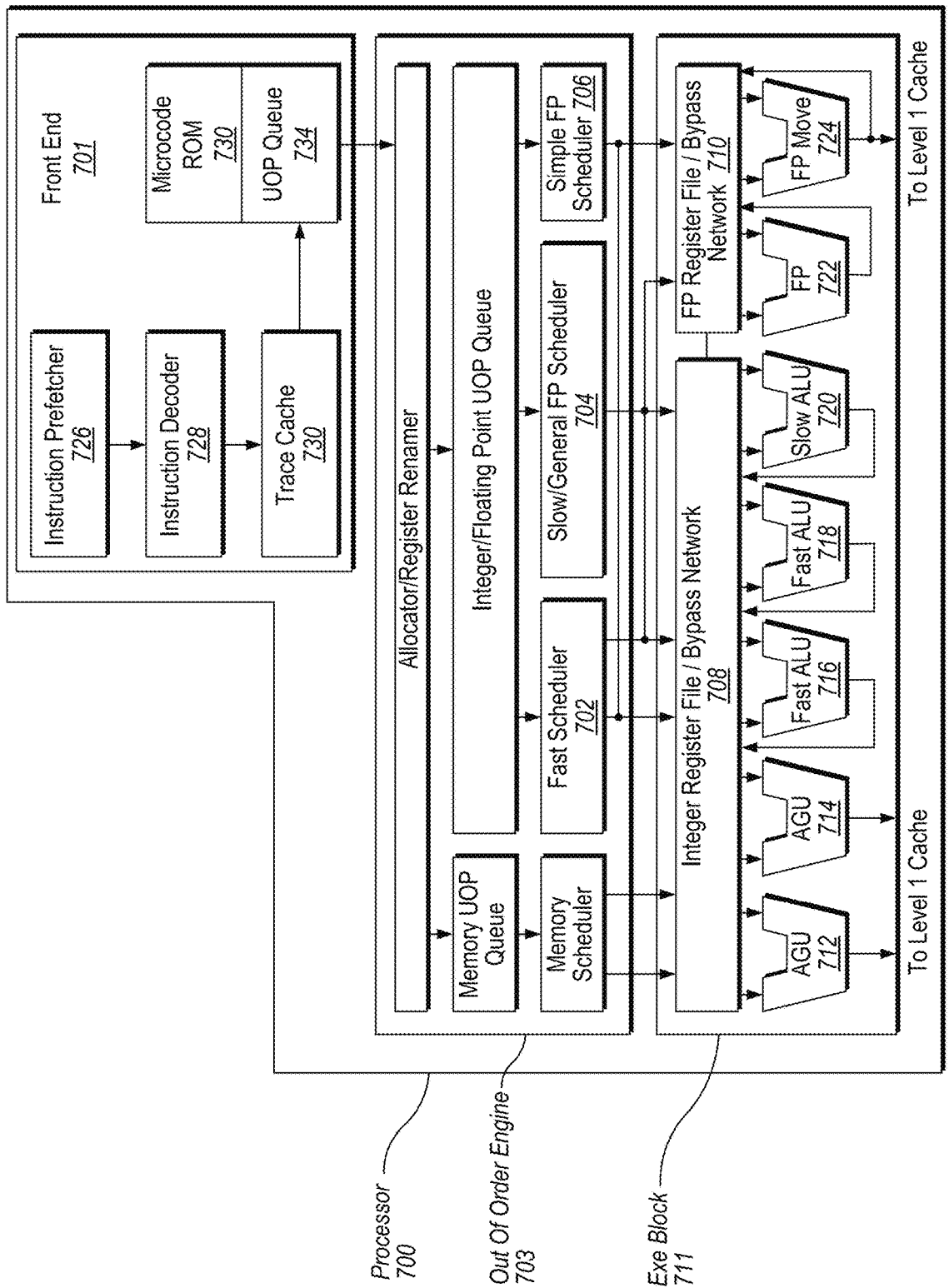
FIG. 7 is a block diagram illustrating a micro-architecture for a processor in accordance with one embodiment of the disclosure.

FIG. 7 illustrates a block diagram of the micro-architecture for a processor 700 (e.g., transmission component 110 or receiving component 120) that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
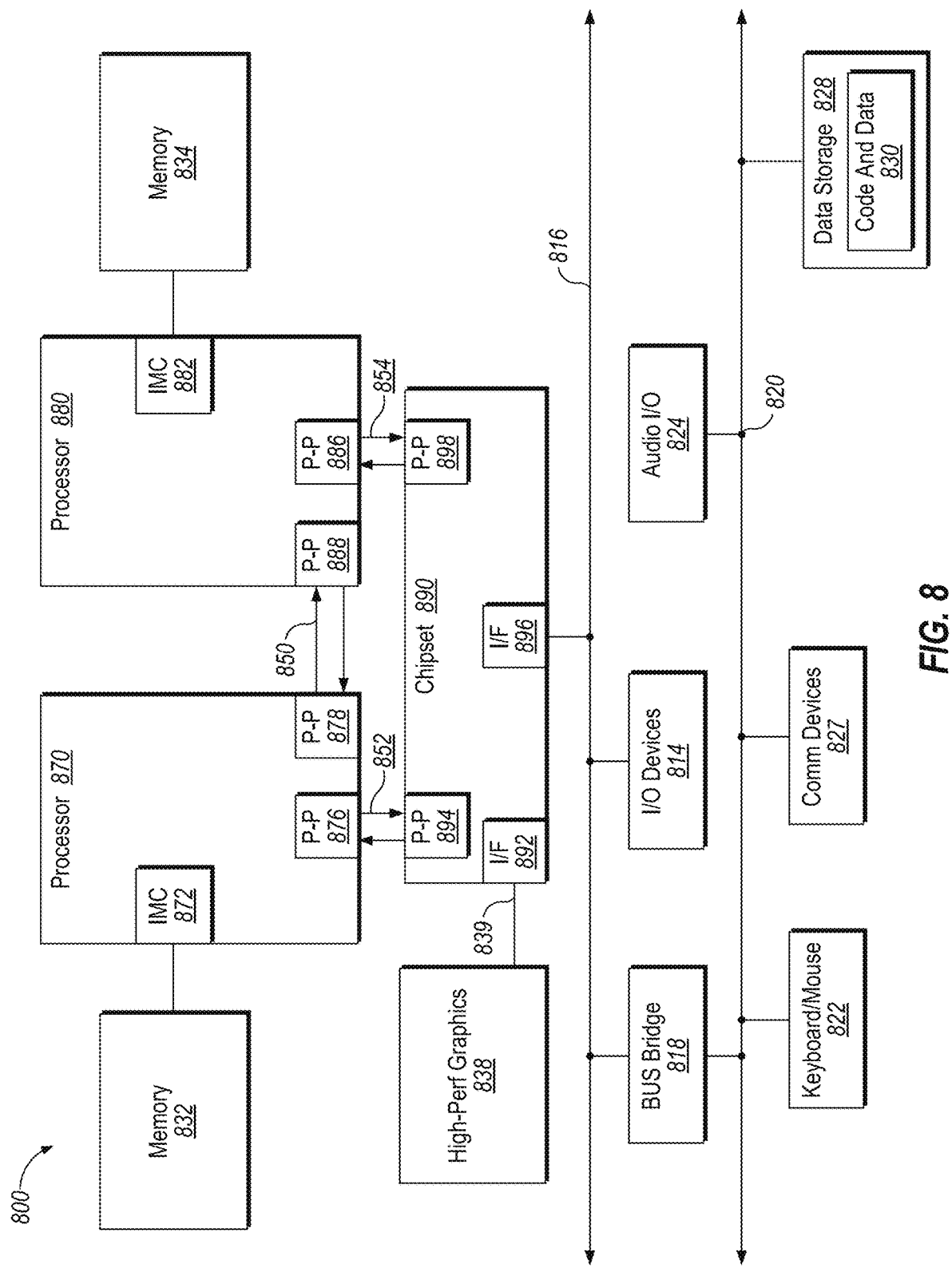
FIG. 8 is a block diagram illustrating a system in which an embodiment of the disclosure may be used.

FIG. 8 is a block diagram illustrating a system 800 in which an embodiment of the disclosure may be used. As shown in FIG. 8, multiprocessor system 800 is a point-to-point interconnect system, and includes a first processor 870 and a second processor 880 (coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement hybrid cores as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
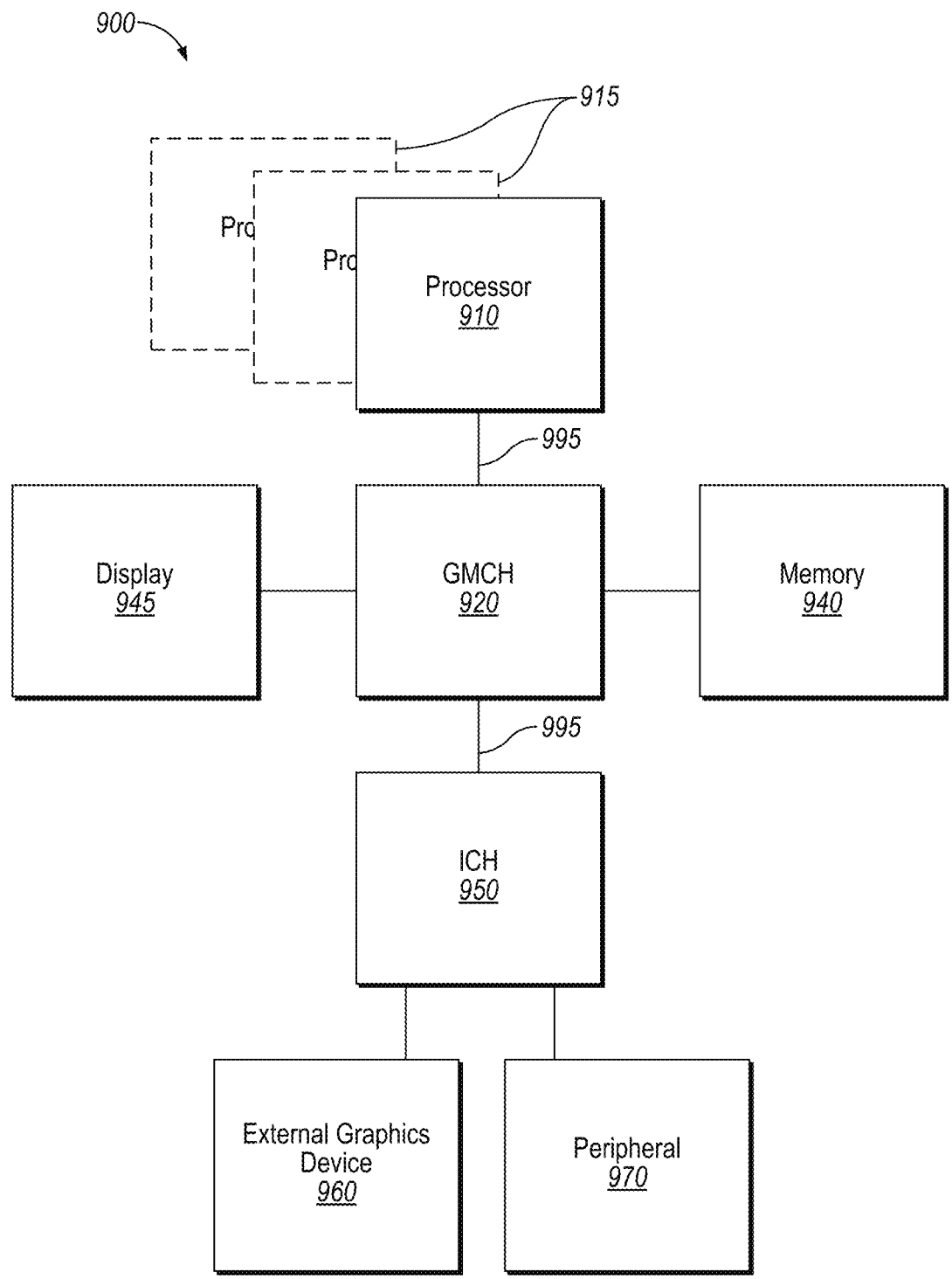
FIG. 9 is a block diagram illustrating a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 implement hybrid cores according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 820 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
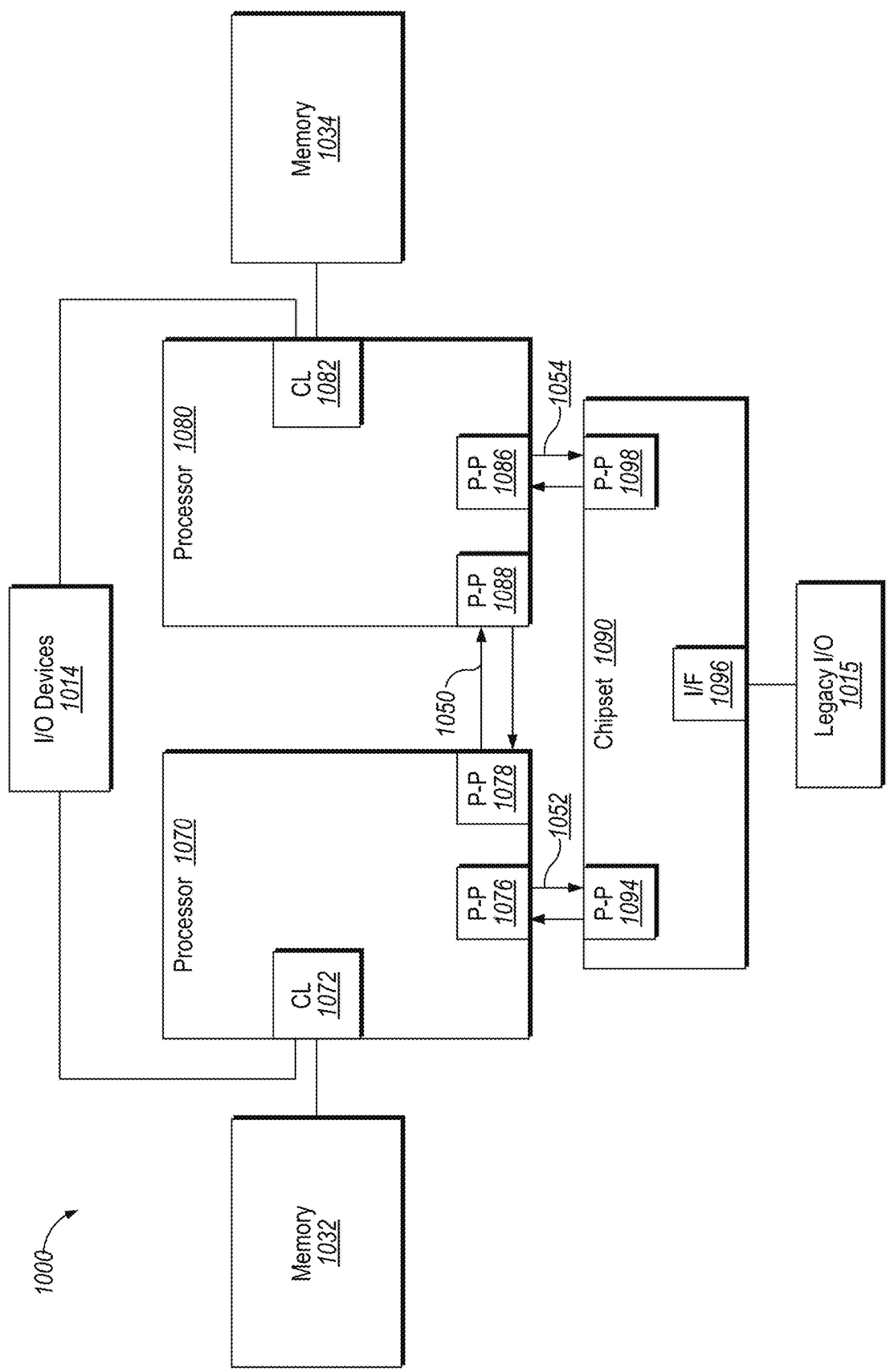
FIG. 10 is a block diagram illustrating a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may implement hybrid cores as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 986 to 998 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
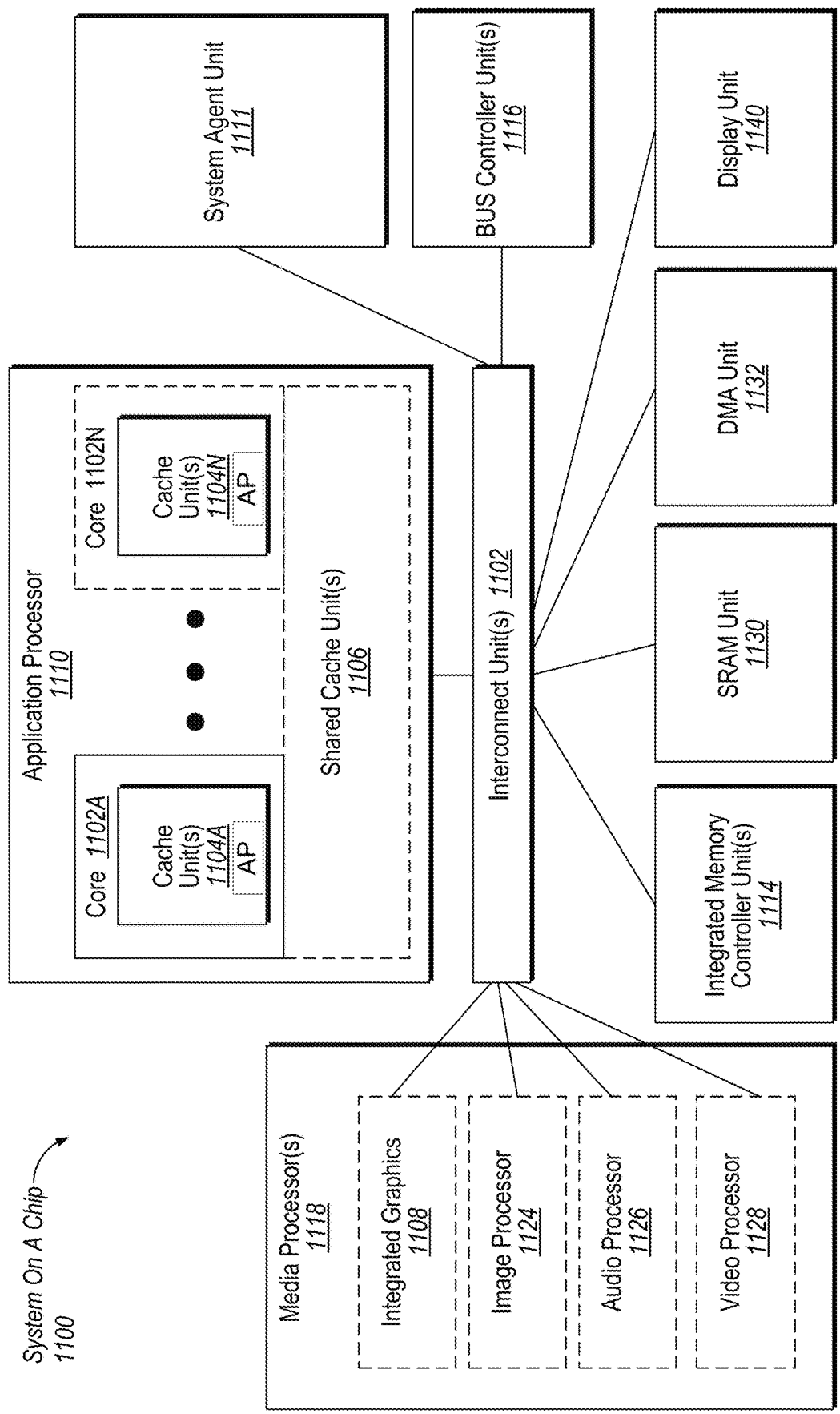
FIG. 11 is a block diagram illustrating a System-on-a-Chip (SoC) according to an embodiment of the disclosure.

Embodiments may be implemented in many different system types. FIG. 11 is a block diagram of a SoC 1100 in accordance with an embodiment of the present disclosure. Dashed lined boxes are optional features on more advanced SoCs. In FIG. 11, an interconnect unit(s) 1112 is coupled to: an application processor 1110 which includes a set of one or more cores 1102A-N and shared cache unit(s) 1106; a system agent unit 1111; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1030; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a store address predictor for implementing hybrid cores as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multithreading. The system agent 1110 includes those components coordinating and operating cores 1102A-N. The system agent unit 1010 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
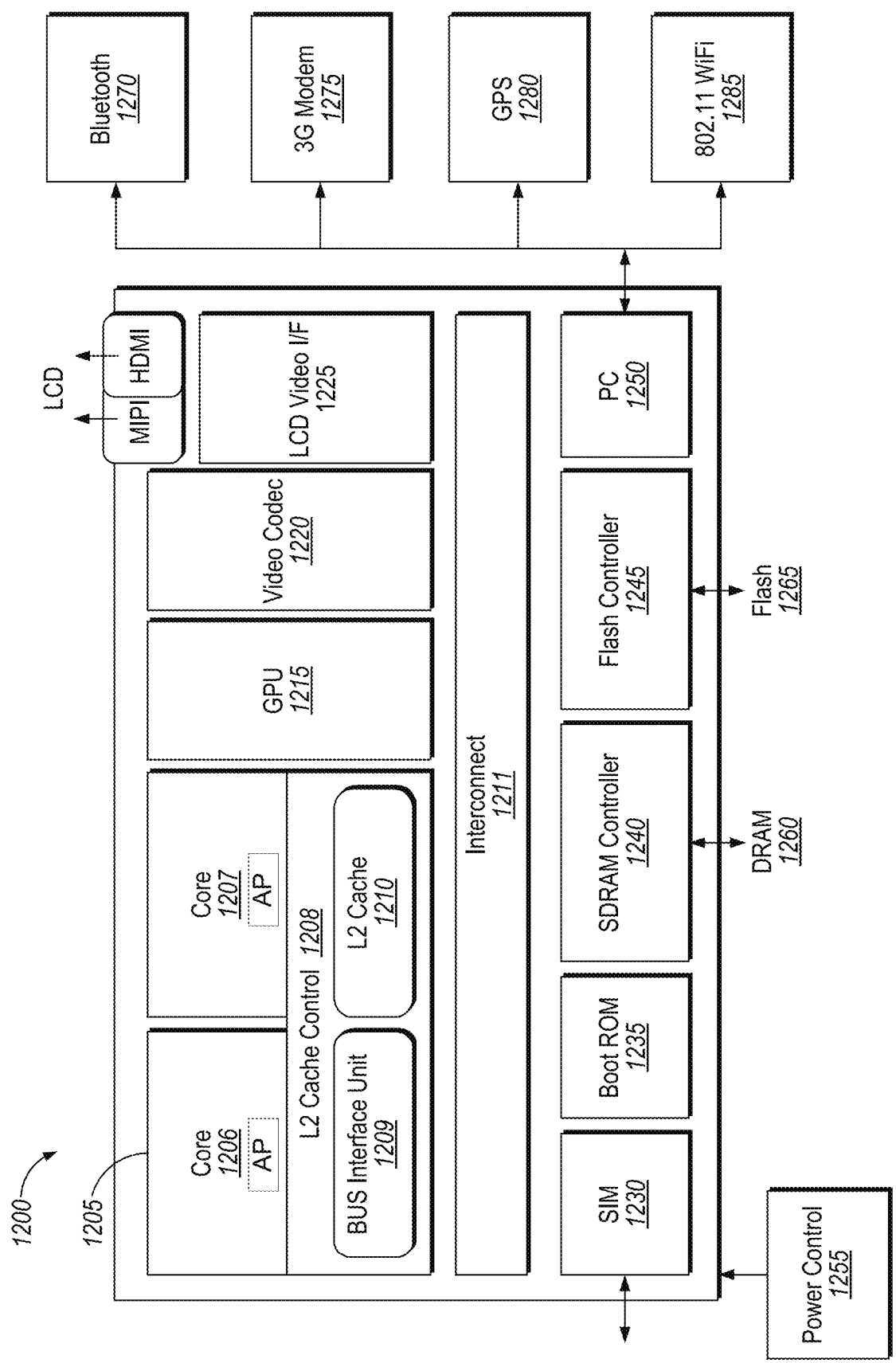
FIG. 12 is a block diagram illustrating a SoC design according to an embodiment of the disclosure.

FIG. 12 is a block diagram of an embodiment of a system on-chip (SoC) design in accordance with the present disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnect discussed above, which potentially implements one or more aspects of the described disclosure. In one embodiment, cores 1206, 1207 may implement hybrid cores as described in embodiments herein.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1285.

Figure 13:
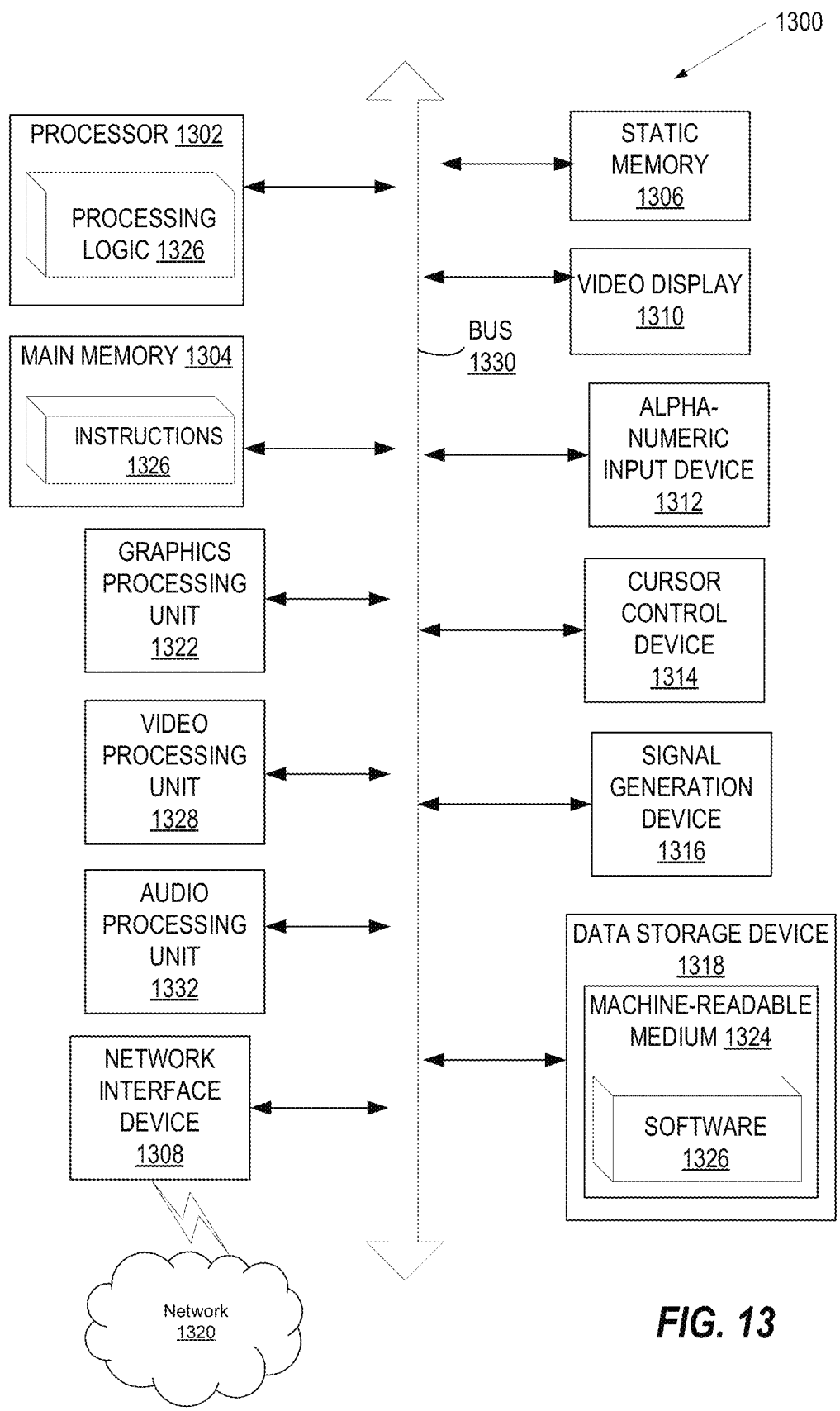
FIG. 13 illustrates a block diagram illustrating a computer system according to an embodiment of the disclosure.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or more processing cores. The processing device 1302 is configured to execute the processing logic 1326 for performing the operations and steps discussed herein.

The computer system 1300 may further include a network interface device 1308 communicably coupled to a network 1320. The computer system 1200 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing store address prediction for memory disambiguation as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The machine-readable storage medium 1324 may also be used to store instructions 1326 implementing store address prediction for hybrid cores such as described according to embodiments of the disclosure. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a transmitter comprising: an input data buffer to store a plurality of bytes of a fixed length, the plurality of bytes being received on a first interconnect; multiplexer circuitry coupled to the input data buffer; and an output buffer coupled to the multiplexer circuitry, a second interconnect, and a third interconnect, wherein the multiplexer circuitry is to: receive byte enable information associated with the plurality of bytes in the input data buffer; determine that one or more of the plurality of bytes stored in the input data buffer are invalid; store an indicator in the output buffer, wherein the indicator, when transmitted on the second interconnect, is to indicate that the one or more of the plurality of bytes are invalid; store valid bytes of the plurality of bytes in the output buffer to transmit on the third interconnect; and store the byte enable information in the output buffer to transmit on the third interconnect, the valid bytes and the byte enable information in the output buffer having the fixed length.

In Example 2, the transmitter of Example 1, wherein the multiplexer circuitry comprises a byte enable information decoder to determine that the one or more of the plurality of bytes are invalid.

In Example 3, the transmitter of Example 1, wherein the multiplexer circuitry comprises a plurality of multiplexers coupled to a byte enable decoder, wherein each multiplexer of the plurality of multiplexers is to receive two bytes of data from the input data buffer.

In Example 4, the transmitter of Example 3, wherein a first multiplexer of the plurality of multiplexers is to: receive a first byte of the plurality of bytes and the byte enable information; receive a select signal from the byte enable decoder; in response to the select signal indicating that each of the plurality of bytes are valid, output the first byte of the plurality of bytes; and in response to the select signal indicating that at least one of the plurality of bytes is invalid, output the byte enable information.

In Example 5, the transmitter of Example 1, a transmitter circuitry coupled to the output buffer; and a partially valid indicator pin coupled to the transmitter circuitry, the transmitter circuitry to transmit the indicator over the partially valid indicator pin.

In Example 6, the transmitter of Example 1, further comprising: a transmitter circuitry coupled to the output buffer, the transmitter circuitry is to: in response to the indicator indicating that the one or more of the plurality of bytes are invalid, transmit the valid bytes of the plurality of bytes and the byte enable information on the second interconnect.

Various implementations may have different combinations of the structural features described above. For instance, all optional features of the processors and methods described above may also be implemented with respect to a system described herein and specifics in the examples may be used anywhere in one or more implementations.

Example 7 is a receiver comprising an input data buffer to store a plurality of bytes of a fixed length, the plurality of bytes being received on a first interconnect, wherein the plurality of bytes includes byte enable information; multiplexer circuitry coupled to the input data buffer; and an output buffer coupled to the multiplexer circuitry, wherein the multiplexer circuitry is to: receive an indicator indicating that the plurality of bytes includes the byte enable information; remove the byte enable information from the plurality of bytes; add a dummy byte to the plurality of bytes in place of the byte enable information; store the plurality of bytes having the dummy byte in the output buffer to transmit on a second interconnect, the plurality of bytes having the dummy byte having the fixed length; and store the byte enable information in the output buffer to transmit on a third interconnect.

In Example 8, the receiver of Example 7, wherein the multiplexer circuitry comprises: a byte enable information decoder to determine that the plurality of bytes include the byte enable information; and a plurality of multiplexers coupled to a byte enable decoder, wherein each multiplexer of the plurality of multiplexers is to receives two bytes of data from the input data buffer.

In Example 9, the receiver of Example 8, wherein a first multiplexer of the plurality of multiplexers to: in response to a select signal from the byte enable information decoder indicating that the plurality of bytes includes the byte enable information, output the byte enable information; and in response to a select signal from the byte enable information decoder indicating that each of the plurality of bytes are valid, output a valid byte of information.

In Example 10, the receiver of Example 8, wherein a first multiplexer of the plurality of multiplexers to: in response to a select signal from the byte enable information decoder indicating that the plurality of bytes includes the byte enable information, output the dummy byte.

In Example 11, the receiver of Example 8 further comprising: a partially valid indicator pin coupled to the byte enable information decoder, the partially valid indicator pin to receive the indicator on the second interconnect.

In Example 12, the receiver of Example 7 further comprising: a transmitter circuitry coupled to the output buffer, the transmitter circuitry is to: transmit the plurality of bytes on the second interconnect.

In Example 13, the receiver of Example 12 wherein the transmitter circuitry is further to: transmit the byte enable information on the third interconnect.

Various implementations may have different combinations of the structural features described above. For instance, all optional features of the processors and methods described above may also be implemented with respect to a system described herein and specifics in the examples may be used anywhere in one or more implementations.

Example 14 is system comprising: a transmitter; a receiver; and an interconnect coupled between the transmitter and the receiver, the transmitter comprising: a first input data buffer to store a plurality of bytes of a fixed length; a first multiplexer circuitry coupled to the first input data buffer; and a first output buffer coupled to the first multiplexer circuitry, wherein the first multiplexer circuitry is to: receive byte enable information associated with the plurality of bytes in the first input data buffer; determine that one or more of the plurality of bytes are invalid; store an indicator indicating that the one or more of the plurality of bytes are invalid in the output buffer to transmit over the interconnect to the receiver; store valid bytes of the plurality of bytes and the byte enable information to transmit over the interconnect to the receiver; and wherein the receiver comprising: a second input data buffer to store the valid bytes of plurality of bytes and the byte enable information received from the interconnect; a second multiplexer circuitry coupled to the second input data buffer; and a second output buffer coupled to the second multiplexer circuitry, wherein the second multiplexer circuitry to: receive the indicator indicating that the one or more of the plurality of bytes are invalid; add a dummy byte to the plurality of bytes plurality; and store the dummy byte and the plurality of bytes in the output buffer, the plurality of bytes having the fixed length.

In Example 15, the system of Example 14, further comprising: an integrated circuit die, wherein the transmitter, the receiver and the interconnect are on the integrated circuit die.

In Example 16, the system of Example 14 further comprising: a first integrated circuit die comprising the transmitter; and a second integrated circuit die comprising the receiver.

In Example 17, the system of Example 14 wherein the first multiplexer circuitry comprises: a byte enable information decoder to determine that the plurality of bytes are partially valid.

In Example 18, the system of Example 14 wherein the second multiplexer is further to: store the byte enable information in the second output buffer.

In Example 19, the system of Example 14 wherein the transmitter component further comprises: a first transmitter circuitry coupled to the first output buffer; and a first partially valid indicator pin coupled to the transmitter circuitry, the transmitter circuitry to transmit the indicator over the first partially valid indicator pin.

In Example 20, the system of Example 14, wherein the receiver component further comprises: a second partially valid indicator pin, the second partially valid indicator pin to receive the indicator from a first partially valid indicator pin.

Various implementations may have different combinations of the structural features described above. For instance, all optional features of the processors and methods described above may also be implemented with respect to a system described herein and specifics in the examples may be used anywhere in one or more implementations.

In Example 19, is a non-transitory computer-readable medium storing instructions, which when executed by a processor, cause the processor to execute a plurality of logic operations comprising: receive byte enable information associated with the plurality of bytes in the input data buffer; determine that the plurality of bytes are partially valid; output an indicator indicating that the plurality of bytes are partially valid; store a portion of the plurality of bytes in the output buffer to transmit on a second data bus of the fixed length; and store the byte enable information in the output buffer to transmit on the second data bus of the fixed length.

Various implementations may have different combinations of the structural features described above. For instance, all optional features of the processors and methods described above may also be implemented with respect to a system described herein and specifics in the examples may be used anywhere in one or more implementations.

Example 24 is an apparatus comprising means for receiving byte enable information associated with the plurality of bytes in the input data buffer; means for determining that the plurality of bytes are partially valid; means for outputting an indicator indicating that the plurality of bytes are partially valid; means for storing a portion of the plurality of bytes in the output buffer to transmit on a second data bus of the fixed length; and storing the byte enable information in the output buffer to transmit on the second data bus of the fixed length.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A transmitter comprising:
an input data buffer to store a plurality of bytes of a fixed length, the plurality of bytes being received on a first interconnect;
multiplexer circuitry coupled to the input data buffer, wherein the multiplexer circuitry comprises a decoder to determine that one or more of the plurality of bytes are invalid; and
an output buffer coupled to the multiplexer circuitry, a second interconnect, and a third interconnect, wherein the multiplexer circuitry is to:
receive byte enable information associated with the plurality of bytes in the input data buffer;
determine that the one or more of the plurality of bytes stored in the input data buffer are invalid;
store an indicator in the output buffer, wherein the indicator, when transmitted on the second interconnect, is to indicate that the one or more of the plurality of bytes are invalid;
store valid bytes of the plurality of bytes in the output buffer to transmit on the third interconnect; and
store the byte enable information in the output buffer to transmit on the third interconnect, the valid bytes and the byte enable information in the output buffer having the fixed length.

2. The transmitter of claim 1, wherein the multiplexer circuitry comprises:
a plurality of multiplexers coupled to the decoder, wherein each multiplexer of the plurality of multiplexers is to receive two bytes of data from the input data buffer.

3. The transmitter of claim 2, wherein a first multiplexer of the plurality of multiplexers is to:
receive a first byte of the plurality of bytes and the byte enable information;
receive a select signal from the decoder;
in response to the select signal indicating that each of the plurality of bytes are valid, output the first byte of the plurality of bytes; and
in response to the select signal indicating that at least one of the plurality of bytes is invalid, output the byte enable information.

4. The transmitter of claim 1, further comprising:
transmitter circuitry coupled to the output buffer; and
a partially valid indicator pin coupled to the transmitter circuitry, the transmitter circuitry to transmit the indicator over the partially valid indicator pin.

5. The transmitter of claim 1, further comprising:
transmitter circuitry coupled to the output buffer, the transmitter circuitry is to:
in response to the indicator indicating that the one or more of the plurality of bytes are invalid, transmit the valid bytes of the plurality of bytes and the byte enable information on the second interconnect.

6. A receiver comprising:
an input data buffer to store a plurality of bytes of a fixed length, the plurality of bytes being received on a first interconnect, wherein the plurality of bytes includes byte enable information;
multiplexer circuitry coupled to the input data buffer;
an output buffer coupled to the multiplexer circuitry, wherein the multiplexer circuitry is to:
receive an indicator indicating that the plurality of bytes includes the byte enable information;
remove the byte enable information from the plurality of bytes;
add a dummy byte to the plurality of bytes in place of the byte enable information;
store the plurality of bytes having the dummy byte in the output buffer to transmit on a second interconnect, the plurality of bytes having the dummy byte having the fixed length; and
store the byte enable information in the output buffer to transmit on a third interconnect; and
transmitter circuitry, coupled to the output buffer, to transmit the plurality of bytes on the second interconnect.

7. The receiver of claim 6, wherein the multiplexer circuitry comprises:
a decoder to determine that the plurality of bytes include the byte enable information; and
a plurality of multiplexers coupled to the decoder, wherein each multiplexer of the plurality of multiplexers is to receives two bytes of data from the input data buffer.

8. The receiver of claim 7, wherein a first multiplexer of the plurality of multiplexers to:
in response to a select signal from the decoder indicating that the plurality of bytes includes the byte enable information, output the byte enable information; and
in response to a select signal from the decoder indicating that each of the plurality of bytes are valid, output a valid byte of information.

9. The receiver of claim 7, wherein a first multiplexer of the plurality of multiplexers to:
in response to a select signal from the decoder indicating that the plurality of bytes includes the byte enable information, output the dummy byte.

10. The receiver of claim 7, further comprising:
a partially valid indicator pin coupled to the decoder, the partially valid indicator pin to receive the indicator on the second interconnect.

11. The receiver of claim 6, wherein the transmitter circuitry is further to:
transmit the byte enable information on the third interconnect.

12. A system comprising:
a transmitter;
a receiver; and
an interconnect coupled between the transmitter and the receiver, wherein:
the transmitter comprises:
a first input data buffer to store a plurality of bytes of a fixed length;
first multiplexer circuitry coupled to the first input data buffer; and
a first output buffer coupled to the first multiplexer circuitry, wherein the first multiplexer circuitry is to:
receive byte enable information associated with the plurality of bytes in the first input data buffer;
determine that one or more of the plurality of bytes are invalid;
store an indicator indicating that the one or more of the plurality of bytes are invalid in the first output buffer to transmit over the interconnect to the receiver;

store valid bytes of the plurality of bytes and the byte enable information to transmit over the interconnect to the receiver; and the receiver comprises:
a second input data buffer to store the valid bytes of plurality of bytes and the byte enable information received from the interconnect;
second multiplexer circuitry coupled to the second input data buffer; and
a second output buffer coupled to the second multiplexer circuitry, wherein the second multiplexer circuitry to:
receive the indicator indicating that the one or more of the plurality of bytes are invalid;
add a dummy byte to the plurality of bytes; and
store the dummy byte and the plurality of bytes in the second output buffer, the plurality of bytes having the fixed length, wherein the second multiplexer circuitry is to store the byte enable information in the second output buffer.

13. The system of claim 12, further comprising:
an integrated circuit die, wherein the transmitter, the receiver and the interconnect are on the integrated circuit die.

14. The system of claim 12, further comprising:
a first integrated circuit die comprising the transmitter; and
a second integrated circuit die comprising the receiver.

15. The system of claim 12, wherein the first multiplexer circuitry comprises:
a decoder to determine that the plurality of bytes are partially valid.

16. The system of claim 12, wherein the transmitter further comprises:
first transmitter circuitry coupled to the first output buffer; and
a first partially valid indicator pin coupled to the first transmitter circuitry, the first transmitter circuitry to transmit the indicator over the first partially valid indicator pin.

17. The system of claim 12, wherein the receiver further comprises:
a second partially valid indicator pin, the second partially valid indicator pin to receive the indicator from a first partially valid indicator pin.

* * * * *